United States Patent [19]
Gale

[11] Patent Number: 6,092,958
[45] Date of Patent: Jul. 25, 2000

[54] PIN RETAINER FOR GROUND ENGAGING TOOLS

[75] Inventor: Preston L. Gale, Mackinaw, Ill.

[73] Assignee: Caterpillar Inc., Peoria, Ill.

[21] Appl. No.: 08/984,629

[22] Filed: Dec. 3, 1997

[51] Int. Cl.$^7$ .................. F16B 21/00; E02F 9/28
[52] U.S. Cl. .................. 403/378; 403/318; 403/155; 37/456; 37/457
[58] Field of Search .................. 37/456, 457, 458, 37/468; 299/103, 102; 403/155, 154, 150, 151, 161, 328, 326, 379.2, 378, 318, 320

[56] References Cited

U.S. PATENT DOCUMENTS

| | | |
|---|---|---|
| 1,951,988 | 3/1934 | MeKeel . |
| 2,435,847 | 2/1948 | Robertson . |
| 2,688,475 | 9/1954 | Small . |
| 3,624,827 | 11/1971 | Liess et al. .................. 37/142 |
| 3,997,988 | 12/1976 | Klett .................. 37/141 R |
| 3,997,989 | 12/1976 | Stepe .................. 37/457 |
| 4,096,653 | 6/1978 | Kaarlela et al. .................. 37/457 |
| 4,288,172 | 9/1981 | Livesay et al. .................. 403/326 X |
| 4,823,486 | 4/1989 | Diekevers et al. .................. 37/142 R |
| 4,918,843 | 4/1990 | Kiesewetter et al. .................. 37/457 X |
| 4,932,478 | 6/1990 | Jones .................. 172/699 |
| 5,077,918 | 1/1992 | Garman .................. 37/141 T |
| 5,172,500 | 12/1992 | Renski et al. .................. 37/457 |
| 5,205,057 | 4/1993 | Garman .................. 37/458 |
| 5,272,824 | 12/1993 | Cornelius .................. 37/458 |
| 5,435,084 | 7/1995 | Immel .................. 37/457 X |
| 5,634,285 | 6/1997 | Renski .................. 37/456 |

FOREIGN PATENT DOCUMENTS

| | | | |
|---|---|---|---|
| 2015662 | 11/1970 | Germany | .................. 37/337 |
| 289076 | 11/1983 | Germany | .................. E02F 9/28 |

*Primary Examiner*—Harry C. Kim
*Attorney, Agent, or Firm*—O. Gordon Pence

[57] ABSTRACT

A bottom mount pin retainer is disclosed for retaining a mounting pin detachably mounting a first member of a ground engaging tool to a second member thereof. The pin retainer utilizes a retainer assemblage that is adapted to relieve a snap-ring employed for retaining the pin from high axial loads in an upward direction while preventing axial movement of the pin in a downward direction. A non-load bearing member used has sufficient load bearing capacity to restrain the upward movement of the snap-ring during the insertion of the pin into the pin openings in order to seat the snap-ring in its snap-ring groove in the pin.

12 Claims, 3 Drawing Sheets

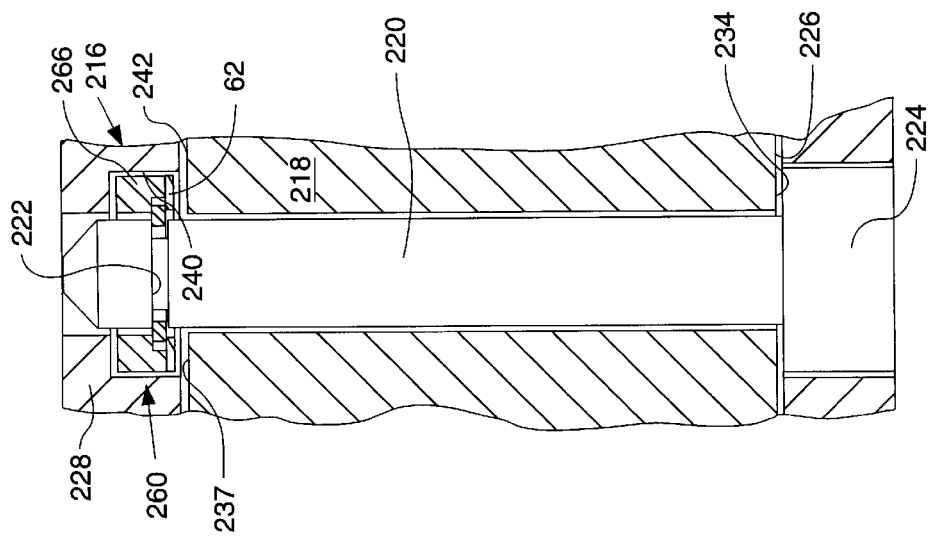
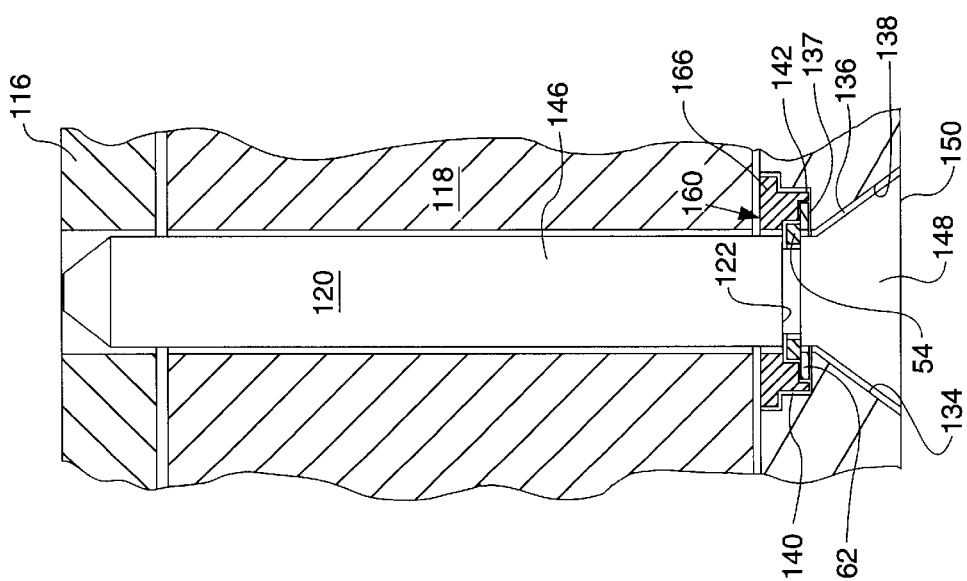

es. Some of
PIN RETAINER FOR GROUND ENGAGING TOOLS

TECHNICAL FIELD

The present invention relates to a pin retainer for ground engaging tools and the like, and more particularly to a bottom mount pin retainer for retaining a mounting pin employed to mount a first member to a second member of a ground engaging tool.

BACKGROUND ART

Various forms of pin(s) have long been used for mounting tips and couplers to supporting bucket adapters. Some of such pins have employed snap-rings to retain the pin such as in U.S. Pat. No. 4,823,486 for a Positive Keeper Means for Pins of Earthworking Tips issued Apr. 25, 1989 to Mark S. Diekevers et. al. Side mounted pins such as disclosed in the preceding patent are sometimes difficult to use to mount bucket tips because of the close spacing of such tips on a bucket. As a consequence, vertical or top mounted pins are preferable in such situations. However when employed on large buckets, such as on large mining shovels for instance, it has been found that large upward vertical forces are exerted on the vertical mounting pin. These upward forces are substantially greater than any downward force exerted on the pin and are sufficiently great to cause the premature shear failure of the snap-ring used to retain the pin.

The present invention is directed to overcoming one or more of the problems encountered in the use of prior art tools and retention devices.

DISCLOSURE OF THE INVENTION

In accordance with one aspect of the present invention, a bottom mount pin retainer is provided for a ground engaging tool. The tool has a first member detachably mounted to a second member thereof by an elongated mounting pin having a snap-ring groove formed therein and being insertable from the bottom into generally vertically disposed aligned pin openings in top and bottom walls of the first member and a pin opening in the second member. The retainer includes a snap-ring adapted for receipt into the snap-ring groove and has an upward side and a downward side. A retainer assemblage is adapted to relieve the snap-ring from high axial loads in an upward direction while preventing axial movement of the pin in a downward direction. The assemblage includes a hard steel washer disposed against the downward side of the snap-ring and a non-load bearing member disposed on the upward side of the snap-ring.

BRIEF DESCRIPTION OF THE DRAWINGS

FIG. 4 is a fragmentary cross-sectional side view, similar to FIG. 1, but depicting another embodiment of the present invention.

FIG. 5 is a fragmentary cross-sectional side view, similar to FIG. 1, but depicting yet another embodiment of the present invention.

BEST MODE FOR CARRYING OUT THE INVENTION

Figure 1:
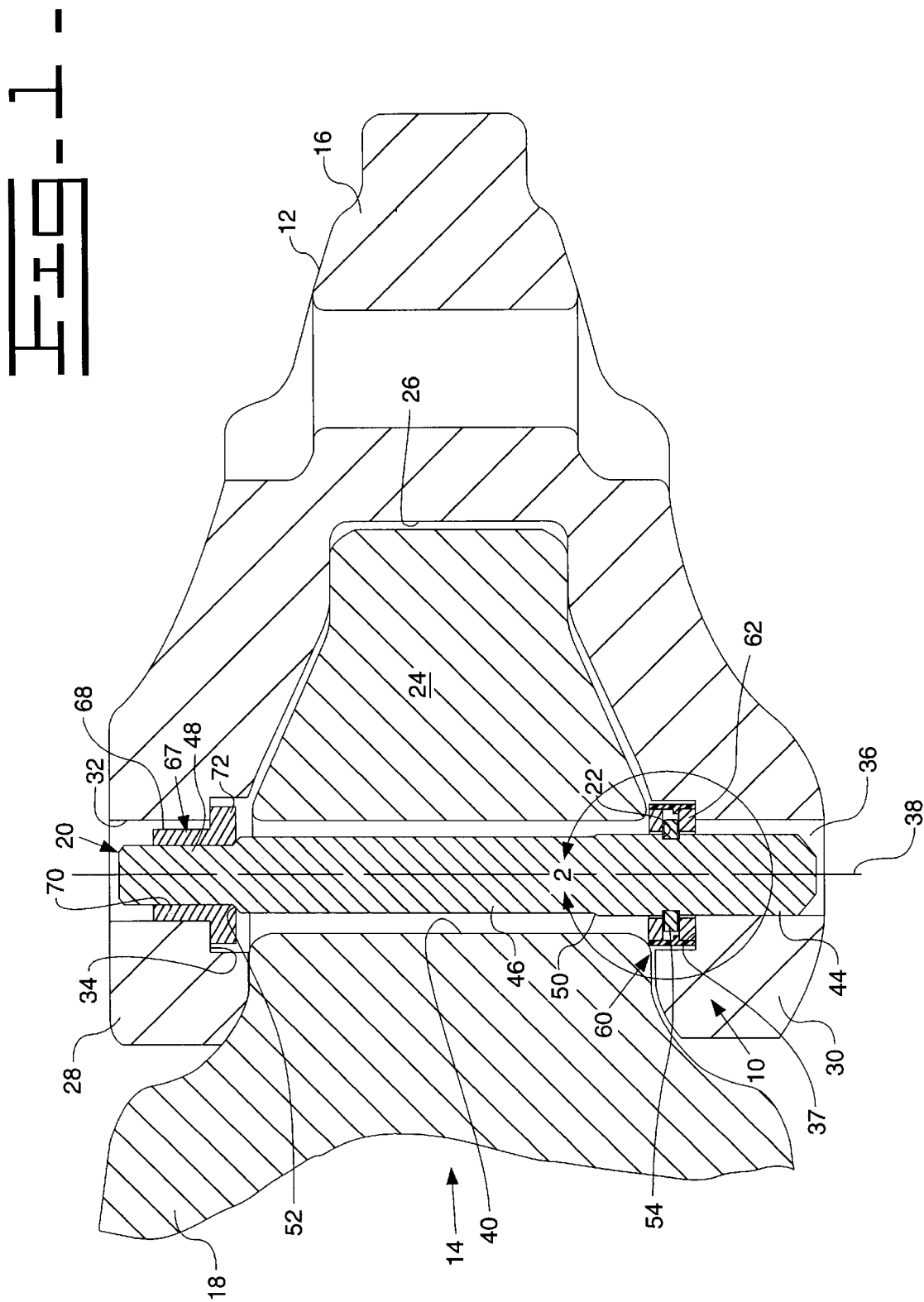
FIG. 1 is a fragmentary cross-sectional side view of a bucket coupler being retained on an adapter by a bottom mount pin retainer embodying the principles of the present invention.

Referring more particularly to the drawings, a bottom mount pin retainer embodying the principles of the present invention is generally shown at 10 in FIG. 1 for a ground engaging tool, such as a bucket (not shown). In general, the tool has a first member 12 that is detachably mounted to a second member 14 thereof by an elongated mounting pin 20.

In the embodiment shown in FIG. 1, the first member 12 is depicted as a coupler 16 and the second member 14 is a bucket adapter 18, which is carried on the bucket. It should be understood, however, that the pin retainer 10 of the present invention may be employed to connect any two earth working components of a ground engaging tool together and those components shown and described herein are merely for illustrative purposes and are not intended to be limiting, as other applications of the pin retainer will be readily apparent to those skilled in the art. For instance, it is intended that the pin retainer 10 be used in applications wherein the first member 12 is a bucket tip (tooth), which is secured by the pin retainer 10 to either the tip coupler 16 or directly to the adapter 18, as is well known in the art, such uses being intended to be within the scope of the present invention.

With the preceding in mind, the second member or adapter 18 has a nose portion 24, which is adapted for receipt into a cavity portion 26 of the first member or coupler 16. The cavity portion 26 is defined by opposed top and bottom walls 28, 30, respectively, and has a top opening 32 through the top wall 28, a first abutment surface 34 disposed about the top opening 32 on the inside of the top wall and a bottom opening 36 through the bottom wall 30 having a second abutment surface 37 disposed thereabout. The top and bottom openings 32,36 are disposed in alignment with each other along a generally upright axis 38.

The adapter 18 has a pin opening 40 therethrough which is alignable with top and bottom openings 32,36 of the coupler 16.

An elongated mounting pin 20 having a snap10 ring groove 22 formed therein is insertable from the bottom into generally vertically disposed aligned pin openings 32,36 in top and bottom walls 28,30 of the first member 12 and the pin opening 40 in the second member 14. The pin 20 is stepped having a first end portion 44 of a first diameter, a middle portion 46 of a second smaller diameter, a second end portion 48 with a third diameter smaller than the second smaller diameter of the middle portion 46. A first conical ramp portion 50 is disposed between the first end portion 44 and the middle portion 46 and a second conical ramp portion 52 is disposed between the middle portion 46 and the second end portion 48.

Figure 2:
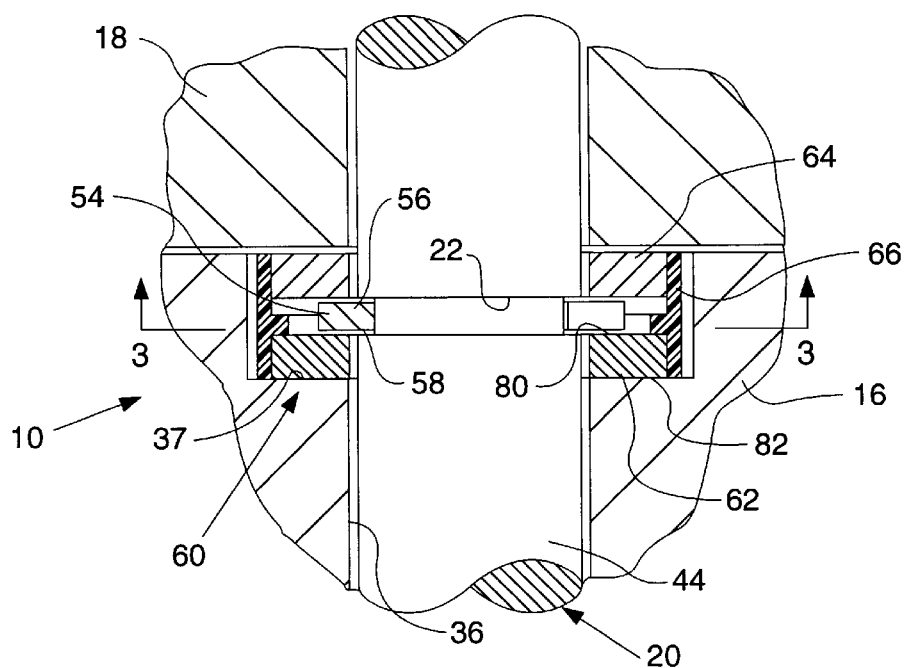
FIG. 2 is an enlarged cross-sectional view of detail 2 of FIG. 1.
Figure 3:
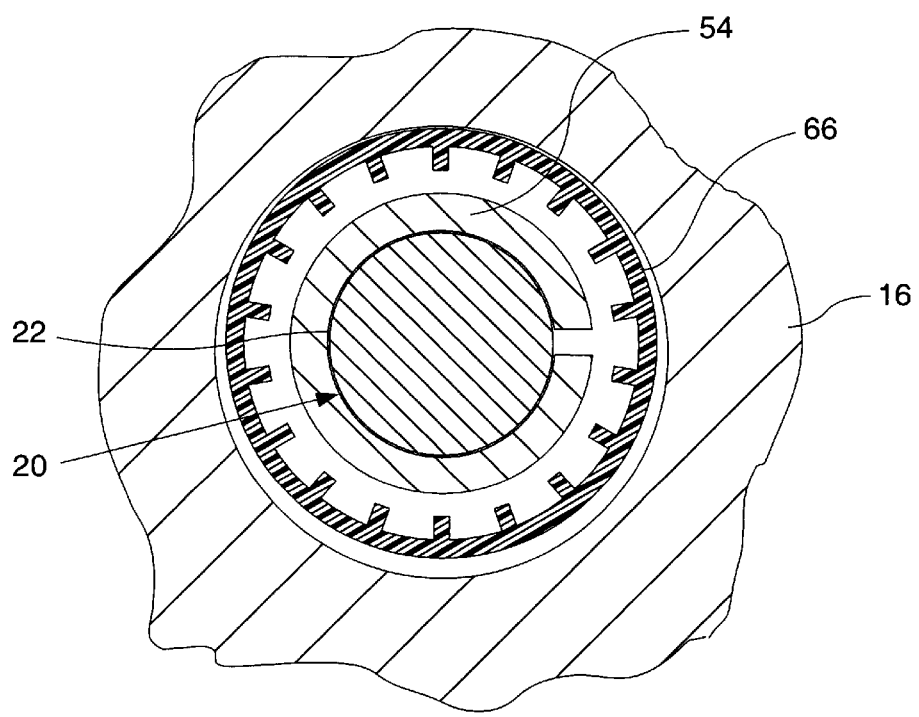
FIG. 3 is a cross-sectional view taken along line 3—3 of FIG. 2.

As best shown in FIG. 2, in accordance with the present invention, the pin retainer 10 includes a snap-ring 54 adapted for receipt into the snap-ring groove 22 and has an upward side 56 and a downward side 58. The snap-ring 54 is preferably constructed of spring steel and of a size adapted to be received within the snap-ring groove 22 of the pin 20.

The retainer 10 also includes a retainer assemblage 60 that is adapted to relieve the snap-ring 54 from high axial loads in an upward direction while preventing axial movement of the pin 20 in a downward direction. The assemblage 60 includes a hard steel retainer washer 62 disposed against the downward side 58 of the snap-ring 54 and a non-load bearing member 64 disposed on the upward side 56 of the snap-ring 54. The retainer washer 62 has a larger inside diameter than the snap-ring 54 so as to fit about the first end portion 44 of the pin 20 and a larger outside diameter so as to have a first side 80 which is adapted to abut against the sides of the snap-ring 54 and a second side 82 which is adapted to abut against the second abutment surface 37 of the coupler 16.

The assemblage 60 also preferably includes an outer sleeve 66 constructed of an elastically stretchable material, such as plastic or rubber, that is sized so as to be sufficiently stretched about the washer 62 and the non-load bearing member 64 in order to retain the washer and the non-load bearing member together and to capture the snap-ring 54 therebetween. Thus, the non-load bearing member 64, snap-ring 54 and washer 62 are retained together by the sleeve 66 as a single unit during the insertion of the pin 20 from the bottom opening 36 until the snap-ring 54 becomes seated in the snap-ring groove 22 of the pin 20.

The non-load bearing member 64 has sufficient load bearing capacity to restrain the upward movement of the snap-ring 54 during the insertion of the pin 20 into the pin openings 32, 36, 40 in order to seat the snap-ring 54 in the snap-ring groove 22 of the pin 20. However, the non-load bearing 64 is constructed of a suitable material such that it lacks the ability to accept high vertical forces from the snap-ring. In particular, the non-load bearing member 64 may be constructed from a compressible plastic or rubber material or from a degradable material such as cork, soft aluminum or the like.

Referring again to FIG. 1, the pin retainer preferably includes an annular bushing 67, preferably constructed from steel, having an outer cylindrical periphery 68 adapted for receipt into the top opening 32 of the coupler 16 and an inner cylindrical periphery 70 adapted for receipt onto the second end portion 48 of the pin 20. The bushing 67 is adapted to contact the second conical ramp portion 52 of the pin and has a radially extending flange 72 thereon, which is adapted to abut against the first abutment surface 34 of the coupler 16 to prevent upward movement of the pin 20.

A second embodiment of the present invention is depicted in FIG. 4 in which identical components are provided with the same reference number they were given in the first embodiment. In FIG. 4, a mounting pin 120 is employed to mount a coupler 116 to an adapter 118. The pin 120 includes a main cylindrical body portion 146 and an enlarged conically shaped head 148 on its lower end 150. The coupler 116 has a bottom opening 136 with a mating conical surface 138, defining the first abutment surface 134, to engage the head 148 of the pin 120 to prevent upward movement of the pin. The coupler also has a recess 140 for receiving a retainer assemblage 160. The pin 120 includes a snap-ring groove 122 adjacent the head 148 for receiving the snap-ring 54 of the assemblage 60. In this embodiment, the recess 140 has a bottom surface 142 defining the second abutment surface 137, which abuts the steel washer 62 to prevent the downward movement of the pin 120. A combined non-load bearing member and retaining sleeve 166 retains the steel washer 62 and captures the lock ring 54 as in the first embodiment. As the remaining construction of the embodiment depicted in FIG. 4 is believed to be adequately shown in the drawing and because it is similar to that depicted in the first embodiment, a further description thereof is not deemed necessary as such construction will be readily apparent to those skilled in the art from the disclosure provided.

A third embodiment of the present invention is depicted in FIG. 5 wherein a mounting pin 220 has an enlarged flat head 224 on one end thereof and a snap-ring groove 222 adjacent to the other end. The head 224 abuts the lower side 226 defining a first abutment surface 234 of the adapter 218 to prevent upward movement of the pin 220. The top wall 228 of the coupler 216 is provided with a recess 240 therein for receiving the retainer assemblage 260 therein such that the steel washer 62 abuts the upper side 242 defining a second abutment surface 237 to prevent downward movement of the pin.

Industrial Applicability

The construction of the present bottom mount pin retainer 10 affords many advantages over prior known pin retainer structures. The retainer assemblage 60 of the present invention allows all of its components to be mounted to the first member 12. Once this is accomplished, the mounting pin 20 is inserted through the bottom opening 36 of the bottom wall 30 into the pin opening 40 of the second member 14. As the pin 44 is moved upward, the conical ramp portion 50 engages the snap-ring 54, which expands the snap-ring until it snaps into place in the snap-ring groove 22. Once the snap-ring 54 is positioned in its groove 22 in the pin 20, the pin is prevented from moving back out of the pin opening 40 due to the abutment of the snap-ring 54 against washer 62, which, in turn, abuts against the second abutment surface 37.

Further upward movement of the pin 20 is prevented by the abutment of ramp portion 52 against the bushing 68 and the abutment of the flange 72 of the bushing against the first abutment surface 34. The forces encountered due to upward pin walking forces on the pin 20 are transferred from the pin 20 into the bushing 68, rather than through the snap-ring 54. The larger surface area afforded by the flange of the bushing than that of the snap-ring 54 is effective in preventing upward pin walking and in preventing the premature failure of the snap-ring 54 due to such pin walking forces.

To remove the pin 20 in order to replace the first member 12, the pin 20 is driven out of its pin opening by the use of a suitable implement with a sufficient force to shear the snap-ring 54 and/or the wall of the snap-ring groove 22.

Other aspects and advantages of the present invention of this invention can be obtained through a study of the drawings, the disclosure and the appended claims.

What is claimed is:

1. A bottom mount pin retainer for detachably mounting a first member of a ground engaging tool to a second member thereof, said first member having generally vertically aligned pin openings in top and bottom walls thereof and said second member having a pin opening therethrough, one of said first and second member having a first abutment surface and one of said first and second member having a second abutment surface, said pin retainer comprising:

an elongated mounting pin having a snap-ring groove formed therein and being insertable from the bottom into said pin openings in said top and bottom walls of said first member and into said pin opening in said second member;

a snap-ring adapted for receipt into said snap-ring groove and having an upward side and a downward side;

a retainer assemblage adapted to relieve said snap-ring from high axial loads in an upward direction while preventing axial movement of said pin in a downward direction, said assemblage including a hard steel washer disposed against the downward side of said snap-ring and a non-load bearing member disposed on the upward side of said snap-ring, said steel washer being positionable in abutting engagement against said second abutment surface to prevent the downward movement of said pin;

means positionable in abutting engagement against said first abutment surface remote from the non-load bearing member for preventing the upward movement of said pin.

2. The pin retainer of claim 1 wherein said non-load bearing member has sufficient load bearing capacity to restrain the upward movement of said snap-ring during the insertion of said pin into said pin openings in order to seat said snap-ring in said snap-ring groove of said pin.

3. The retainer of claim 2 wherein said pin is stepped having a first end portion of a first diameter, a middle portion of a second smaller diameter, a second end portion with a third diameter smaller than second smaller diameter of said middle portion, a first conical ramp portion between said first end portion and said middle portion and a second conical ramp portion between said middle portion and said second end portion.

4. The retainer of claim 3 wherein said means for preventing the upward movement of said pin includes a steel bushing adapted for receipt in said opening in said top wall and about said second end portion, said bushing being engageable against said second ramp portion of said pin.

5. The retainer of claim 4 wherein said first abutment surface is disposed about said opening in said top wall and wherein said bushing has a radially extending flange portion disposable in abutting engagement with said first abutment surface to prevent the upward movement of said pin.

6. The retainer of claim 5 wherein said retainer assemblage includes a sleeve for retaining said steel washer and said non-load bearing member together with said snap-ring therebetween during the insertion of said mounting pin.

7. The retainer of claim 6 wherein said non-load bearing member is constructed of a compressible plastic material.

8. The retainer of claim 6 wherein said non-load bearing member is constructed of degradable material.

9. The retainer of claim 1 wherein said bottom wall of said first member has said second abutment surface and wherein said steel washer is disposable in abutting engagement against said second abutment surface to prevent the downward movement of said pin.

10. The retainer of claim 2 wherein said first member is one of group consisting of a bucket tip and a coupler, and said second member is one of a group consisting of a coupler and an adapter.

11. The retainer of claim 1 wherein said mounting pin has an enlarged head at one end thereof positionable in abutting engagement against said first abutment surface to prevent the upward movement of said pin and wherein said steel washer is positionable in abutting engagement against said second abutment surface to prevent the downward movement of said pin.

12. A bottom mount pin retainer for detachably mounting a first member of a ground engaging tool to a second member thereof, said second member having a mounting portion adapted to be received between a top wall and a bottom wall of said first member, said mounting portion having a pin opening therethrough positionable in alignment with a top opening in the top wall and with a bottom opening in the bottom wall, and one of said first and second member having a first abutment surface and one of said first and second member having a second abutment surface, comprising:

an elongated mounting pin having a snap-ring groove formed thereabout, said pin being adapted for upward insertion into said bottom opening and into said pin opening and said top opening of the respective first and second members;

a snap-ring adapted for receipt into said snap-ring groove and having an upward side and a downward side, each side extending radially outwardly from said snap-ring groove when said snap-ring is mounted within said groove;

a retainer assemblage adapted to relieve said snap-ring from high axial loads in an upward direction while preventing axial movement of said pin in a downward direction, said assemblage including a hard steel washer disposed against the downward side of said snap-ring and a non-load bearing member disposed on the upward side of said snap-ring, said non-load bearing member having sufficient load bearing capacity though to restrain the upward movement of said snap-ring during the insertion of said pin in order to permit the insertion of said pin through said snap-ring so as to seat said snap-ring in said snap-ring groove of said pin;

means positionable in abutting engagement against said first abutment surface remote from the non-load bearing member for preventing the upward movement of said pin.

* * * * *